US012585594B2

(12) United States Patent
Wen et al.

(10) Patent No.: US 12,585,594 B2
(45) Date of Patent: *Mar. 24, 2026

(54) CACHE LOOK UP DURING PACKET PROCESSING BY UNIFORMLY CACHING NON-UNIFORM LENGTHS OF PAYLOAD DATA IN A DUAL-STAGE CACHE OF PACKET PROCESSORS

(71) Applicant: Fortinet, Inc., Sunnyvale, CA (US)

(72) Inventors: Shushan Wen, Pleasant Hill, CA (US); Zhi Guo, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,158

(22) Filed: Jun. 26, 2024

(65) Prior Publication Data
US 2024/0427706 A1      Dec. 26, 2024

Related U.S. Application Data

(63) Continuation of application No. 18/129,072, filed on Mar. 31, 2023, now Pat. No. 12,079,136.

(51) Int. Cl.
*G06F 12/0897* (2016.01)
(52) U.S. Cl.
CPC ................................ *G06F 12/0897* (2013.01)

(58) Field of Classification Search
CPC .................................................. G06F 12/0897
See application file for complete search history.

(56) References Cited

U.S. PATENT DOCUMENTS

| | | | | |
|---|---|---|---|---|
| 6,754,662 | B1* | 6/2004 | Li ........................ | G06F 16/9014 |
| | | | | 707/693 |
| 9,298,723 | B1* | 3/2016 | Vincent ................. | G06F 16/183 |
| 2008/0212586 | A1* | 9/2008 | Wang ...................... | H04L 45/60 |
| | | | | 370/392 |
| 2010/0040066 | A1* | 2/2010 | Hao ..................... | H04L 45/7459 |
| | | | | 370/395.31 |
| 2018/0375773 | A1* | 12/2018 | Gobriel ............... | H04L 45/7459 |

* cited by examiner

*Primary Examiner* — Ryan Bertram
(74) *Attorney, Agent, or Firm* — Law Office of Dorian Cartwright; Dorian Cartwright

(57) ABSTRACT

At a first stage, cells of a row of the index table are searched, using a portion of the unified hash value bits as index to identify the row of the index table. Also, a pointer to the content table is identified by comparing an index table tag of an entry of a cell with a calculated tag of the hash to identify a cell in the row. At a second stage, a cell is looked up in the content table, responsive to a match of calculated tag of the hash and index table tag of entry, comparing the current full key value and the full key value in the content table entry. The content table full key value is retrieved using a pointer from the cell of the index table to the content table from the cell entry.

6 Claims, 13 Drawing Sheets

200

300

```
insert_v1(key, payload, type_id)
{
  idx = hash(key);
  row = ITBL[idx.loc];
  for (e in row) { // every entry in row
    if (e.vld == 0) {
      d_size = get_size(type_id); // get CTBL entry size from type_id
      d = alloc(d_size); // allocate d_size for CTBL entry
      d->key = key;
      d->payload = payload;
      e.ptr = d;
      e.tag = idx.tag;
      e.type_id = type_id;
      e.vld = 1;
      return (SUCCESS, idx);
    }
  }
  return (FAILURE, idx);
} delete_v1(key, type_id)
{
  idx = hash(key);
  row = ITBL[idx.loc];
  for (e in row) { // every entry in row
    if (e.type_id == type_id && e.tag == idx.tag) {
      ptr = e.ptr;
      free(ptr); // free CTBL entry
      e.vld = 0; // invalidate e
      return SUCCESS;
    }
  }
  return FAILURE;
}
```

*FIG. 4B*

```
replace_v1(key, payload, type_id)
{
        (ret,idx) = insert_v1(key, payload, type_id);
        if(ret == SUCCESS)
                return ret;
        //now all entries in row are used
        row = ITBL[idx.loc];
        idx_in_row = select_idx_in_row(row);
        e = row[idx_in_row];
        if(e.type_id != type_id){
                free(e.ptr); //free old CTBL entry
                d_size = getsize(type_id); //get CTBL entry size from type_id
                d = alloc(d_size); //allocate d_size for new CTBL entry
                e.ptr = d;
                e.type_id = type_id;
        }
        d = e.ptr;
        d->key = key;
        d->payload = payload;
        e.tag = idx.tag;
        return SUCCESS;

```
/* Assume d_size is 1/(2^m), m=0,1,2,...,M-1, of a pre-defined UNIT_SIZE.
   Given d_size = UNIT_SIZE/(2^m), d_type = m.
 */ insert_v2(key, payload, type_id)
{
  idx = hash(key);
  row = ITBL[idx.loc];
  d_size = get_size(type_id); // get CTBL entry size from type_id
  d_type = get_d_type(d_size); // map d_size to d_type idx_in_row = 0; // index in row
  for (e in row) { // every entry in row
    if (e.vld == 0) {
      d = alloc_ctbl_unit_opt(row, idx_in_row, type_id, d_type, d_size);
      d->key = key;
      d->payload = payload;
      e.ptr = d;
      e.tag = idx.tag;
      e.type_id = type_id;
      e.vld = 1;
      return (SUCCESS, idx);
    }
    idx_in_row++;
  }
  return (FAILURE, idx);
} delete_v2(key, type_id)
{
  idx = hash(key);
  row = ITBL[idx.loc];
  d_size = get_size(type_id);
  d_type = get_d_type(d_size);
  idx_in_row = 0;
  for (e in row) { // every entry in row
    if (e.type_id == type_id && e.tag == idx.tag) {
      ptr = e.ptr;
      free_ctbl_unit_opt(ptr, row, idx_in_row, type_id, d_type, d_size);
      e.vld = 0; // invalidate e
      return SUCCESS;
    }
    idx_in_row++;
  }
  return FAILURE;
}
```

FIG. 4E

```
replace_v2(key, payload, type_id)
{
  (ret, idx) = insert_v2(key, payload, type_id);
  if (ret == SUCCESS)
    return ret;
  // now all entries in row are used
  row = ITBL[idx.loc];
  d_size = get_size(type_id);
  d_type = get_d_type(d_size);
  idx_in_row = select_idx_in_row(row);
  e = row[idx_in_row];
  if (e.type_id != type_id) {
    ptr = e.ptr;
    free_ctbl_unit_opt(ptr, row, idx_in_row, type_id, d_type, d_size);
    d = alloc_ctbl_unit_opt(row, idx_in_row, type_id, d_type, d_size);
    e.ptr = d;
    e.type_id = type_id;
  }
  d = e.ptr;
  d->key = key;
  d->payload = payload;
  e.tag = idx.tag;
  return SUCCESS;
}
```

FIG. 4F

```
find_ctbl_unit(row, idx_in_row, type_id, d_type, d_size)
{
  ptr = NULL;
  idx_start = idx_in_row - (idx_in_row % (1<<d_type));
  idx_end = idx_start+(1<<d_type)-1;
  idx_in_unit = 0;
  for (i=idx_start; i<=idx_end; i++) {
    if (i==idx_in_row) {
      idx_in_unit++;
      continue; // skip idx_in_row itself
    }
    e = row[i];
    if (e.vld == 1) {
      e_d_size = get_size(e.type_id); // get d_size of e
      if (e_d_size == d_size) {
        // found e with the same given d_size
        ptr = e.ptr - idx_in_unit*d_size; // get starting address of the unit
        curr_idx_in_unit = idx_in_row % (1<<d_type);
        ptr += curr_idx_in_unit*d_size;
        break;
      }
    }
    idx_in_unit++;
  }
  return ptr;
} free_ctbl_unit(ptr, idx_in_row, d_type, d_size)
{
  curr_idx_in_unit = idx_in_row % (1<<d_type);
  ptr -= curr_idx_in_unit*d_size; // get starting address of the unit
  free(ptr);
} free_ctbl_unit_opt(ptr, row, idx_in_row, type_id, d_type, d_size)
{
  ptr2 = find_ctbl_unit(row, idx_in_row, type_id, d_type, d_size);
  if (ptr2 == NULL) // no other entry uses the unit
    free_ctbl_unit(ptr); // free CTBL unit
} alloc_ctbl_unit(idx_in_row, d_type, d_size)
{
  ptr = alloc_unit_size(); // allocate UNIT_SIZE for CTBL unit
  curr_idx_in_unit = idx_in_row % (1<<d_type);
  ptr += curr_idx_in_unit*d_size;
  return ptr;
} alloc_ctbl_unit_opt(row, idx_in_row, type_id, d_type, d_size)
{
  ptr = find_ctbl_unit(row, idx_in_row, type_id, d_type, d_size);
  if (ptr == NULL)
    ptr = alloc_ctbl_unit(idx_in_row, type_id, d_type, d_size);
  return ptr;
}
```

*FIG. 4G*

CACHE LOOK UP DURING PACKET PROCESSING BY UNIFORMLY CACHING NON-UNIFORM LENGTHS OF PAYLOAD DATA IN A DUAL-STAGE CACHE OF PACKET PROCESSORS

RELATED APPLICATIONS

This application is a continuation of U.S. application Ser. No. 18/129,072, filed on Mar. 31, 2023, which is incorporated herein by reference in its entirety.

FIELD OF THE INVENTION

The invention relates generally to computer networks, for cache look up during packet processing by uniformly caching non-uniform lengths of payload data that have various lengths of keys to the payload data in a dual-stage cache of a packet processor.

BACKGROUND

In an enterprise-grade network security system for high-speed networks, packet classification is a very costly process. Classifying a packet usually involves lookups that go through multiple dimensions and many ranges per dimension in order to find a final match, in a policy set that can have thousands of policies or more. On the other hand, in many scenarios, a number of similar packets belonging to the same classification category or at least sharing certain features arrive with high frequency during a certain period of time. Therefore, the search results of the first packet of the same sequence of packets can be cached and reused to reduce the classification cost.

When facing a huge number of search dimensions and ranges, a cache that is capable of storing a variety of search results is critical, which requires the design to handle the search requests with different lengths of keys as well as payloads. The cache lookup can return a final result or a middle-stage result that will be further used for another search, depending on the implementation, and/or the complexity of the policy set.

Due to the fact that many search results exist only for a certain period of time, a run-time insertion, deletion, and cache replacement scheme is needed.

What is needed is a robust technique for cache look up during packet processing by uniformly caching non-uniform lengths of payload data that have various lengths of keys to the payload data in a dual-stage cache of a packet processor.

SUMMARY

To meet the above-described needs, methods, computer program products, and systems for cache look up during packet processing by uniformly caching non-uniform lengths of payload data that have various lengths of keys to the payload data in a dual-stage cache of a packet processor.

In one embodiment, a data packet with a header and a payload at the packet processor is received. Metadata of the data packet includes a key and a type ID. The packet processor comprises a dual-stage cache having an index table with uniform length entry size and having a content table with non-uniform length entry sizes to store different cached key data payload data. A unified hash value of various lengths of keys is calculated from type ID and key of packet header retrieved from the metadata.

In another embodiment, at a first stage, cells of a row of the index table are searched, using a portion of the unified hash value bits as index to identify the row of the index table. Also, a pointer to the content table is identified by comparing an index table tag of an entry of a cell with a calculated tag of the hash to identify a cell in the row. In another embodiment, at a second stage, a cell is looked up in the content table, responsive to a match of calculated tag of the hash and index table tag of entry, comparing the current full key value and the full key value in the content table entry. The content table full key value is retrieved using a pointer from the cell of the index table to the content table from the cell entry.

In still another embodiment, a payload is output responsive a cache hit, responsive to a match of input full key value and content table full key value. The payload data is obtained in the content table.

Advantageously, computer performance is improved with better cache classification in packet processing.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 4B is a sample of pseudocode for insertion and deletion when CTBL entries have separated memory blocks, according to an embodiment.

FIG. 4C is a sample of pseudocode for replacement when CTBL entries have separated memory blocks, according to an embodiment.

FIG. 4E is a sample of pseudocode for insertion and deletion when CTBL entries have shared memory blocks, according to an embodiment.

FIG. 4F is a sample of pseudocode for replacement when CTBL entries have shared memory blocks, according to an embodiment FIG. 4G is a sample of pseudocode for assistant functions when CTBL entries have shared memory blocks, according to an embodiment.

DETAILED DESCRIPTION

Methods, computer program products, and systems for cache look up during packet processing by uniformly caching non-uniform lengths of payload data that have various lengths of keys to the payload data in a dual-stage cache of a packet processor. One of ordinary skill in the art will recognize many alternative embodiments that are not explicitly listed based on the following disclosure.

I. Network Device for Uniformly Caching Non-Uniform Lengths (FIG. 1)

Figure 1:
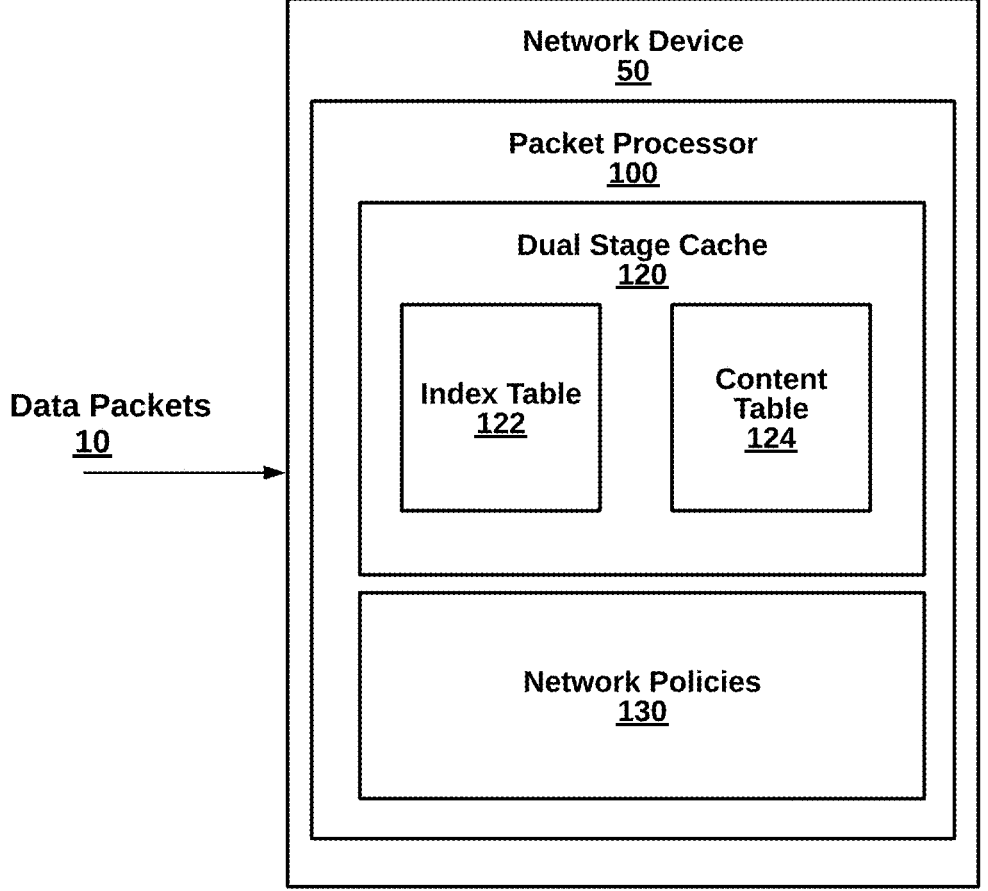
FIG. 1 is a high-level block diagram illustrating a dual-stage cache of a packet processor for cache look up during packet processing by uniformly caching non-uniform lengths of payload data that have various lengths of keys to the payload data, according to one embodiment.

FIG. 1 is a high-level block diagram illustrating a dual-stage cache of a packet processor 100 for cache look up during packet processing by uniformly caching non-uniform lengths of payload data that have various lengths of keys to the payload data, according to one embodiment. The packet processor 100 includes a dual stage cache 120 with an index table 122 and a content table 124. The packet processor 100 of this example is part of a network device 50 that examines data packets 10 using network policies 130. Other embodiments of the system 100 can include additional components that are not shown in FIG. 1, such as controllers, network gateways, access points, and additional wired or wireless stations.

The network device 50 can be coupled to a data communication network such as a private network connected to a public network, such as the Internet. The network device 50 can be connected to the data communication system via hard wire or wireless networking. The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPV4 or IPV6 address spaces.

II. Methods for Uniformly Caching Non-Uniform Lengths (FIGS. 2-4H)

Figure 2:
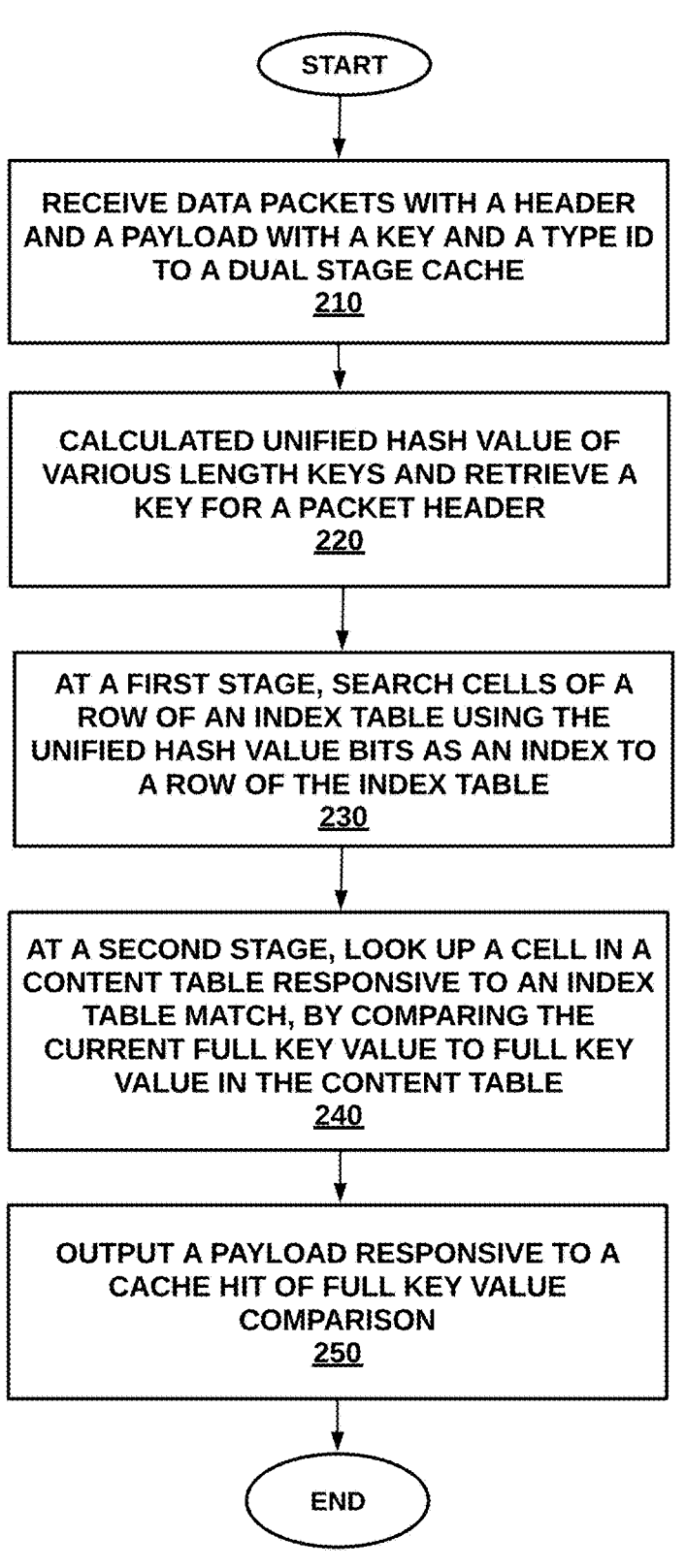
FIG. 2 is a more detailed block diagram illustrating a firewall device of the system of FIG. 1, according to one embodiment.

FIG. 2 is a high-level flow diagram illustrating a method 200 for cache look up during packet processing by uniformly caching non-uniform lengths of payload data that have various lengths of keys to the payload data in a dual-stage cache of a packet processor, according to one embodiment. The method 300 can be implemented by, for example, system 100 of FIG. 1.

At step 210, A data packet with a header and a payload at the packet processor is received. Metadata of the data packet includes a key and a type ID. The packet processor comprises a dual-stage cache having an index table with uniform length entry size and has a content table with non-uniform length entry sizes to store different cached key data payload data.

At step 220, a unified hash value of various lengths of keys from type ID is calculated. In turn, a key of a packet header is retrieved from the metadata.

At step 230, at a first stage, cells of a row of the index table are searched, using a portion of the unified hash value bits as index to identify the row of the index table. Also, a pointer to the content table is identified by comparing an index table tag of an entry of a cell with a calculated tag of the hash to identify a cell in the row.

At step 240, at a second stage, a cell in the content table is looked up, responsive to a match of calculated tag of the hash and index table tag of entry, comparing the current full key value and the full key value in the content table entry. The content table full key value is retrieved using a pointer from the cell of the index table to the content table from the cell entry.

At step 250, a payload is output responsive a cache hit, responsive to a match of input full key value and content table full key value, and the payload data is obtained in the content table.

A. Packet Classification with Cache Assistance

Figure 3A:
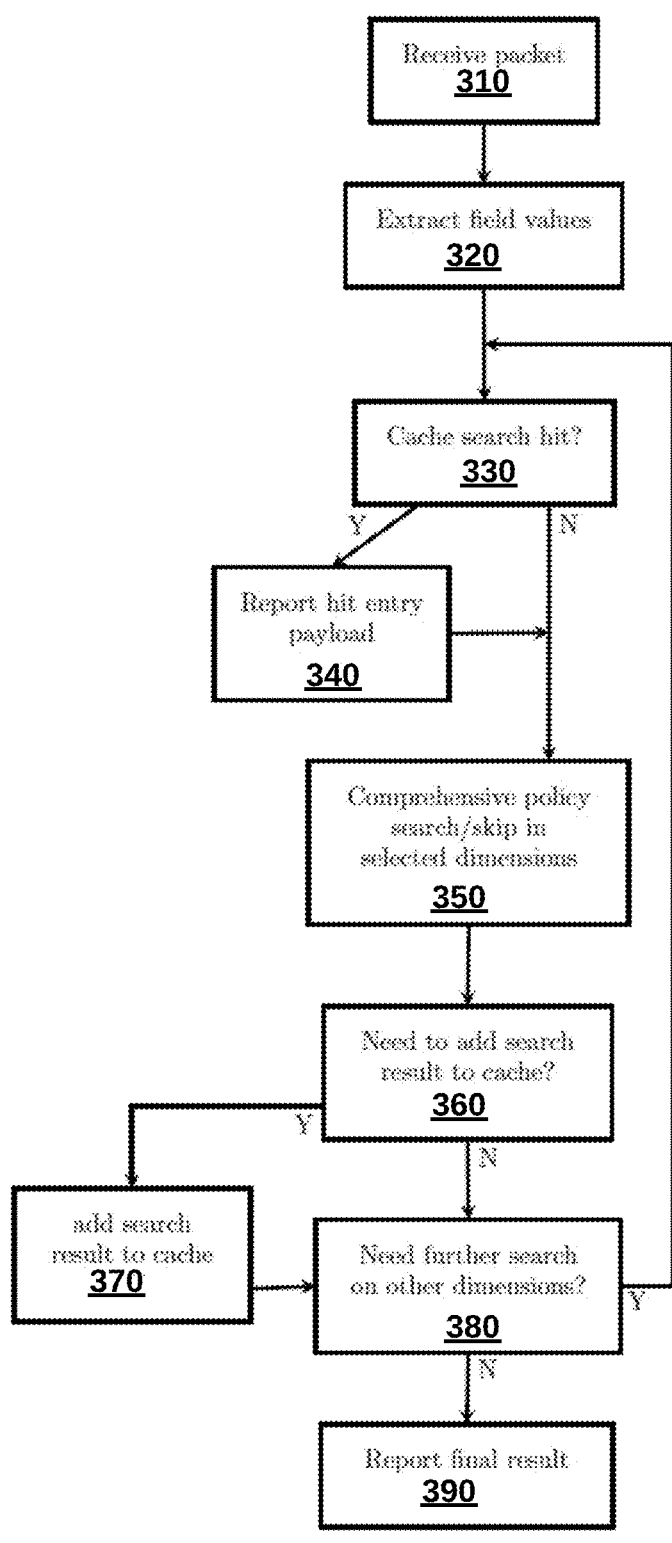
FIG. 3A is a more detailed flow chart of policy search with cache, according to one embodiment.

The flowchart of packet classification process with cache assistance is given by FIG. 3A. After receiving a packet (310), some fields of the packet are extracted (320), which can be a combination of source IP address, destination IP address, protocol, source port, destination port, and other extra fields. These fields can be fully or partially used to create a key for a cache search (330). If it is a hit, the corresponding payload of the hit entry in the cache is reported (340), and this report may aid a comprehensive policy search on certain dimensions (350). A dimension in a comprehensive policy search is one or more fields that the search process checks independently. With the help of the cache, the search result on a given dimension that is cached can also become an intermediate result that the comprehensive policy search (partially) relies on. In the best scenario, the process can choose to skip the comprehensive policy search altogether if the cache payload has the final result needed for the packet classification.

If the cache search is a miss, no cache report can be used, and the comprehensive policy search will be conducted without the help from the cache. Once an intermediate result or final result is obtained, the system has an option to add the result to the cache (360 and 370). To make the cache more cost-effective, the system can choose to add the results which are frequently queried during a certain period of time, and/or the results that take a longer time to search if no cache.

It is possible that an intermediate result of the comprehensive policy search requires another dimension search (380), which leads to a new round of cache search (330), and so on.

When the search is completed, the final result is reported (390).

One embodiment of cache usage is to find the internet service ID of a given packet, based on a set of pre-defined mapping relationships, each with a certain number of IP ranges, plus additional restrictions on protocols and port ranges. Once the internet service ID is found, it is combined with the search results of other dimensions to decide the action for packet handling.

B. Keys and Payloads

The cache stores and retrieves different types of results during the policy search process, and each type has its own keys and payloads with a variety of length, which is different from a conventional cache that handles fixed-length keys and payloads.

Figure 3B:
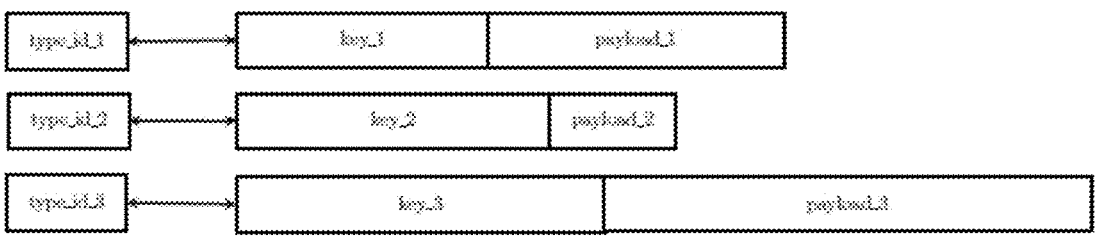
FIG. 3B is a block diagram showing a mapping from type_ids to key-payload lengths, according to an embodiment.

In order to have a general-purpose cache, each type of key-payload pair is mapped to a type_id. FIG. 3B shows an embodiment that has three type_ids. Once a type_id is known, the key length and the payload length are also known.

Figure 3C:
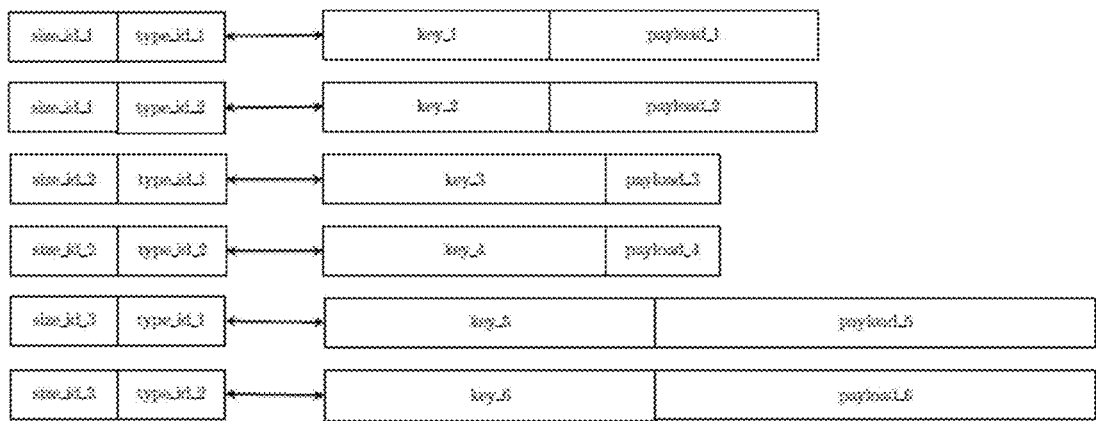
FIG. 3C is a block diagram showing a mapping from size_id to key-payload lengths, and type_id ruse, according to an embodiment.

FIG. 3C shows another embodiment that uses type_id and size_id to distinguish key and payload types. This design has higher configurability when multiple type_ids share the same size_id. Thus, a lower chance of false positive cache hits can be achieved, when a matching type_id is also required during cache search. As shown in FIG. 3C, type_id and size_id together determine the key and payload types. Therefore, under different size_ids, type_id can be reused to save cache space. In FIG. 3C, type_id_1 is reused by {key_1, payload_1}, {key_3, payload_3}, and {key_5, payload_5}, as they have different size_ids, i.e., size_id_1, size_id_2, and size_id_3, respectively.

C. The Dual-Stage Cache

The general-purpose cache design needs to satisfy two requirements: 1) the cache is fast to find a hit (or miss) with minimal false positive, and 2) the cache is able to search a variety of key-payload pairs. Our invention employs a dual-stage searching process to achieve this goal.

Figure 3D:
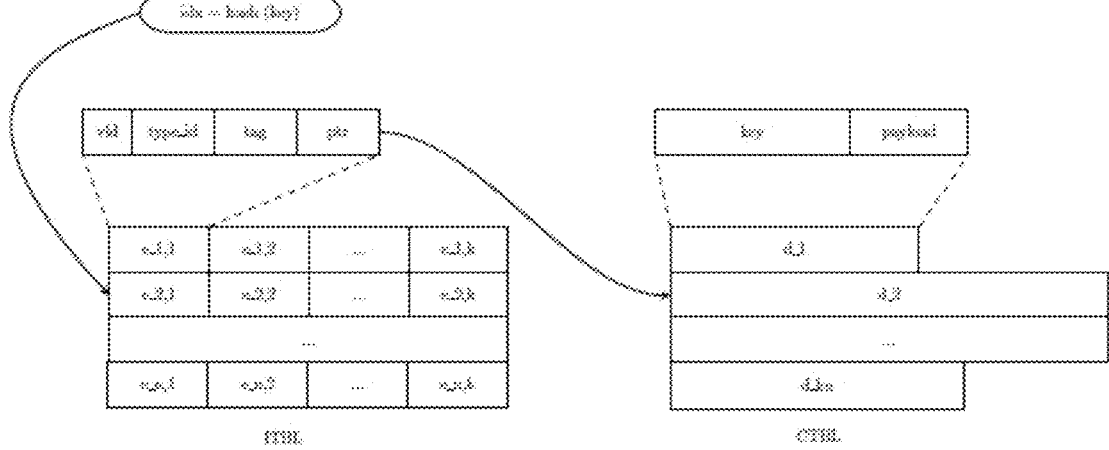
FIG. 3D is a block diagram illustrating a dual-stage table in cache, according to an embodiment.

The first stage is based on an index table (ITBL), and the second stage is based on a content table (CTBL), as illustrated in FIG. 3D. ITBL has n rows, each having k entries, represented by $e\_1, 1, e\_1, 2, \ldots, e\_n,k$. Each ITBL entry has a fixed length, composed of the following fields: 1) a single valid bit (vld) to indicate the entry's validity, 2) a type_id (or an aforementioned type_id and size_id combination), 3) a tag, and 4) a pointer (ptr). The CTBL has up to k multiplied by n (kn) entries (represented by $d\_1, d\_2, \ldots, d\_kn$), each having a key and a payload, which do not necessarily have the same size between entries.

Figure 4A:
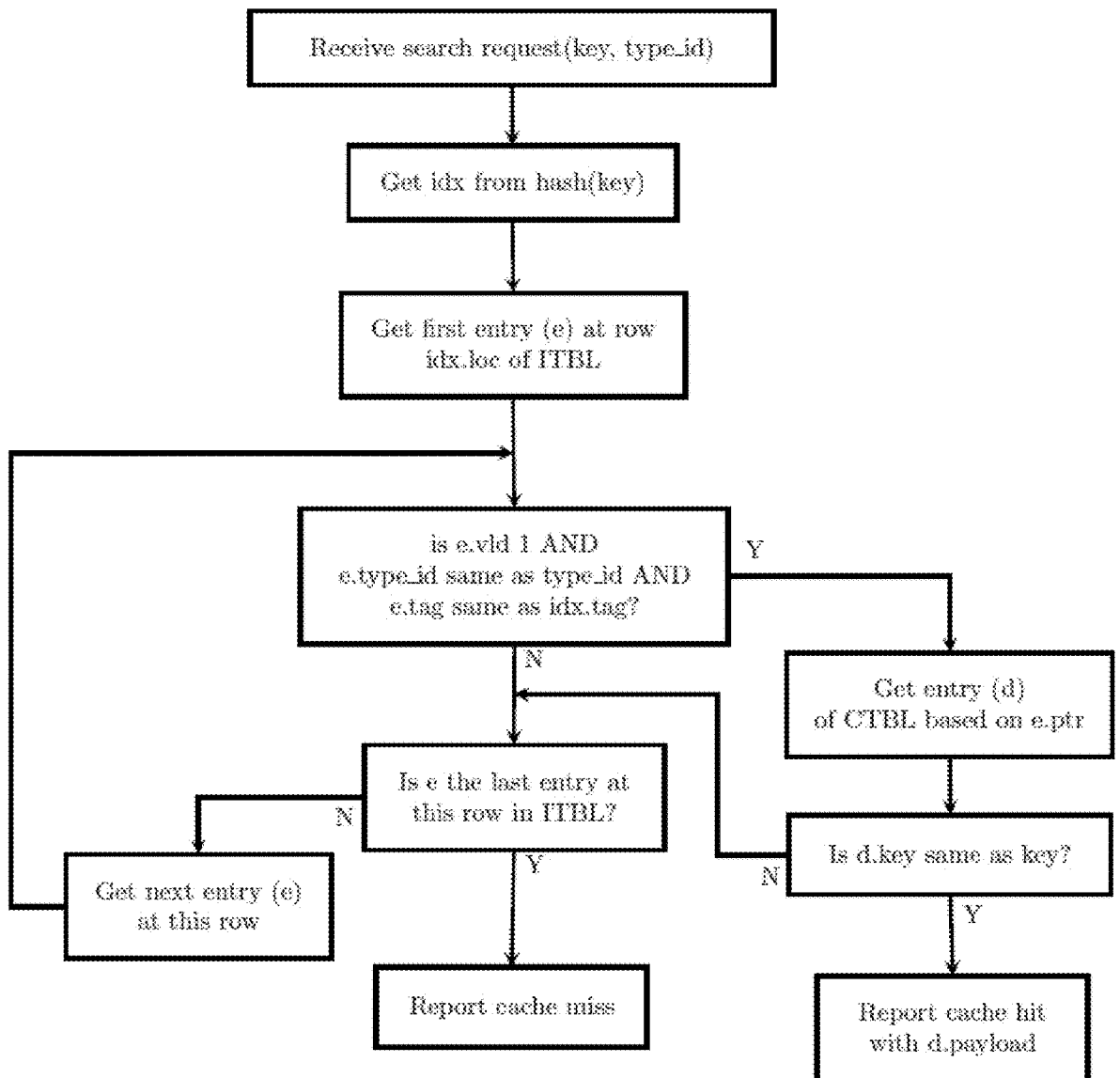
FIG. 4A is a flowchart illustrating a method for cache look up in a dual-stage cache, from the method of FIG. 3A, according to an embodiment.

The cache lookup process is illustrated in FIG. 4A. When a cache lookup (i.e., search request) is started, the search key is hashed to an index (idx). A variable-length to fixed-length hash (e.g., CRC) can be chosen for this task, depending upon the software and hardware capability and configuration. Part of the index value (idx.loc) tells the row location of the ITBL. At this location, the tag of each of the k entries is used to match the rest of the index value (idx.tag), if the vld bit of that entry is 1. Once the tag is a match, the corresponding ptr of the same entry is used to locate a CTBL entry. Then, the key in corresponding CTBL entry is used to further confirm the key is identical as the original search key, to eliminate a false positive introduced by the hash. If the key has a match, the corresponding payload is reported.

D. Insertion, Deletion, and Replacement of Cache Entries

As the CTBL entries can have different sizes, based on how they are allocated, the dual-stage cache can have different embodiments of insertion, deletion, and replacement schemes.

1. Separated Memory Blocks for CTBL Entries

In this embodiment, each CTBL entry has its own memory block, with the pseudocode given in FIGS. 4B and 4C, where three major pseudo functions, insert_v1, delete_v1, and replace_v1 describe corresponding aspects of the scheme.

During an insertion operation, the ITBL row is located based on the hash result of the given key. Each entry in the row is checked for its vld bit. If one of them is invalid, this entry is updated by on tag, type_id, and ptr, which carries the address of the newly allocated CTBL entry. The CTBL entry, meanwhile, keeps values of key and payload. Finally, this ITBL entry's vld bit is set to 1 before it is ready to use.

A deletion operation, after locating the ITBL row, looks for an entry in the row to match the given type_id and tag, which is part of the idx from the hash. Once this entry is found, the corresponding CTBL entry is freed and ITBL entry vld bit is cleared.

A replacement operation, often happening during runtime when a new key-payload mapping needs to be cached while the cache may or may not be full, checks whether an insertion operation is successful. If yes, the replacement operation is equivalent to the insertion operation. Otherwise, it chooses an entry in the row of the ITBL (select_idx_in_row) located by the hash result, and inspects whether this entry has the same type_id as the new one. The pseudo function select_idx_in_row can be as complex as Least Recent Used (LRU) on one end of the spectrum of replacement strategies, or a simple random selection on the other end of the spectrum, depending upon the application features and system limits. If the type_ids are different, the old CTBL entry is freed, a new CTBL entry is allocated, and the ITBL entry's ptr and type_id are updated. Regardless of the type_id comparison result, the CTBL entry's key and payload are updated, as well as the ITBL entry's tag.

According to one embodiment, the ITBL has a timestamp field. All the ITBL entries' timestamps are periodically checked and old ITBL-CTBL pairs are purged.

According to one embodiment, the ITBL has a version field. All the ITBL entries' versions are periodically compared and certain version's ITBL-CTBL pairs are purged.

2. Shared Memory Block for CTBL Entries

In some systems, the hardware may have a limit on CTBL entry size allocation. This embodiment, shown in FIG. 8, can be applied to such systems, where each allocation request (alloc_ctbl_unit) gets a fixed-size (UNIT_SIZE) block. Meanwhile, in order to use this UNIT_SIZE block more efficiently, type_id is mapped to d size that is $\text{UNIT\_SIZE}/(2^m)$, $m=0, 1, \ldots, M-1$. For example, the largest d size is UNIT_SIZE ($m=0$), the second largest d size is UNIT_SIZE/2 ($m=1$), and so on.

Figure 4D:
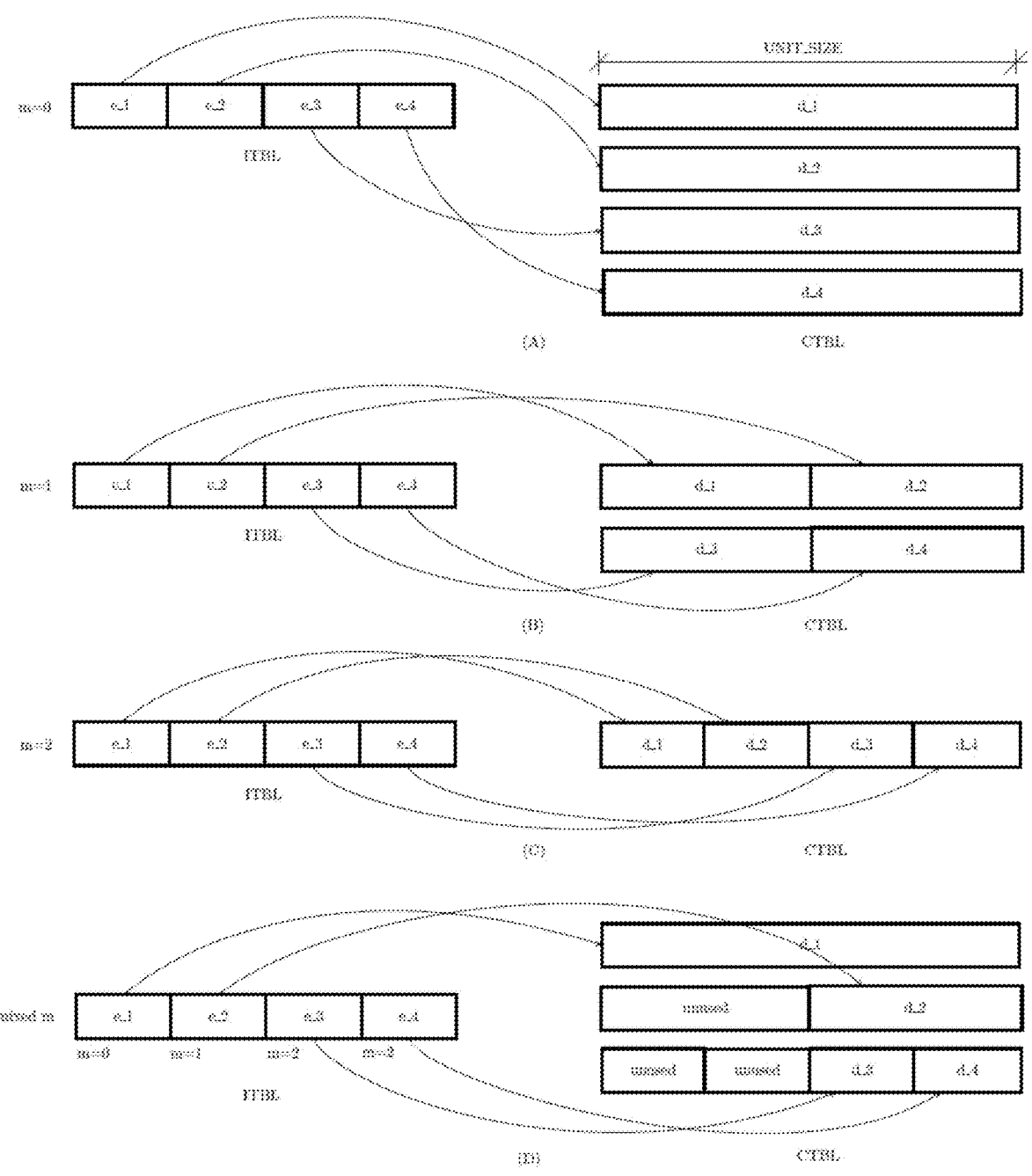
FIG. 4D is block diagrams showing several cases of connections between the table entries for shared memory block for CTBL entries, according to an embodiment.

FIG. 4D illustrates several cases of using CTBL blocks of UNIT_SIZE. In FIG. 4D (A), at an ITBL row, all entries have $m=0$, each pointed to a full-sized block of CTBL. In FIG. 4D (B), the ITBL entries have $m=1$, each pointed to a half of a block of CTBL. In FIG. 4D (C), the ITBL entries have $m=2$, each pointed to a quarter of a block of CTBL. A case with mixed m is shown in FIG. 4D (D), where the ITBL entry e_2, which has $m=1$, is pointed to the 2nd half of the corresponding CTBL block, represented by d_2; meanwhile, the 1st half of the same block is unused but can be used in the near future if e_1 is replaced by another entry that also has $m=1$. Similarly, e_3 and e_4, both having $m=2$, are pointed to the 3rd and the 4th quarter of corresponding CTBL block, while the 1st or the 2nd quarter can be used in the future if m of e_1 or e_2 changes to 2.

In the pseudocode of FIGS. 4E, 4F, 4G, besides major pseudo functions insert_v2, delete_v2, and replace_v2, assistant functions find_ctbl_unit, free_ctbl_unit, free_ctbl_unit_opt (optimized free_ctbl_unit), alloc_ctbl_unit, and alloc_ctbl_unit_opt (optimized alloc_ctbl_unit) are also used to help the description.

In the pseudo functions, variable d_type carries the value of m. Pseudo function insert_v2 calls alloc_ctbl_unit_opt, which tries to find the corresponding CTBL block if there is one, or allocates a block with UNIT_SIZE by calling alloc_unit_size otherwise.

Pseudo function delete_v2 calls free_ctbl_unit_opt, which checks whether some other ITBL entry still uses the CTBL block, and only frees the block when none is found.

7

Both alloc_ctbl_unit_opt and free_ctbl_unit_opt call find_ ctbl_unit, which searches neighboring entries of given idx_in_row of the row, and tries to find a valid entry with the same d size. The starting point (idx_start) and the ending point (idx_end) of the search range are determined by the minimal and maximal possible index in the row of an entry that shares the same CTBL block, respectively. When such a valid entry (e) in the neighborhood is found, the starting address of the block (unit) can be obtained by deducting the offset from e.ptr, and the value of ptr corresponding to the entry at idx_in_row is updated by adding the new offset on the starting address.

E. Additional Embodiments

1. Same Key, Different Payloads

As the generic purpose cache supports different mapping relationships, it is possible the cache may keep multiple payloads from the same key. Since ITBL is often implemented in faster hardware such as on-chip memory with a limited capacity, if the CTBL entries based on the same key are concatenated and share the same ITBL entry, the memory usage will improve.

Figure 4H:
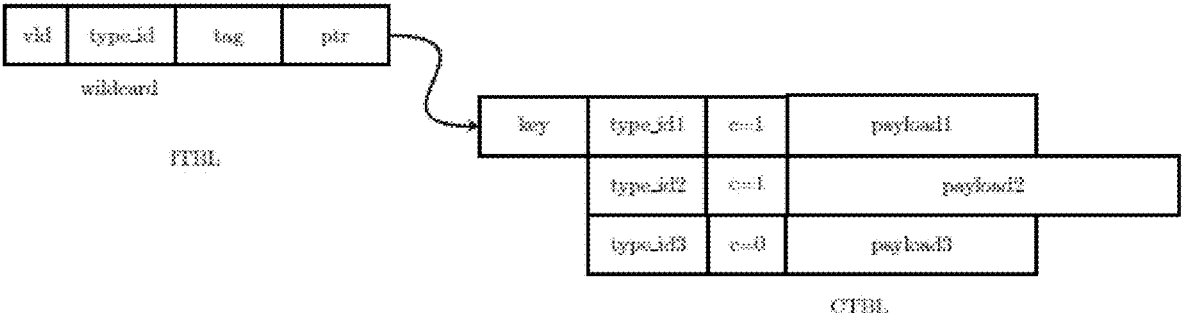
FIG. 4H is a block diagram for concatenated CTBL entries sharing the same key, according to an embodiment

An embodiment of this consideration is illustrated in FIG. 4H, where one ITBL entry is pointed to three concatenated CTBL entries. Since the ITBL entry is used to match multiple type_ids, its type_id field can be a wildcard. The CTBL entries that share the same key field, but specify their own type_id. There is a new field c for "continue". If c is 1, there is another CTBL entry after the current payload field; otherwise it is the last CTBL entry for the given key.

2. Fairness Between Type_Ids

In order to provide a certain level of fairness of cache usage for different type_ids, a counter for each type_id can be used to count the number of entries in the cache. When the count reaches a threshold that indicates that this type_id occupies more entries than its fair share, the cache replacement scheme will replace the entries corresponding to this type_id before considering other entries.

If there are many type_ids in the system, a counter can be assigned to a type_id group instead of an individual type_id. Therefore, fairness is measured between groups.

3. Using CTBL Unit Index as Pointer in ITBL

There is a balance between CTBL memory usage and ITBL memory usage.

When the CTBL resides on the slower memory, and if the system has enough memory for a pre-allocated entire CTBL to meet the maximum requirement, the CTBL can be divided into units and an entry can be located by an index of the first unit that falls into the entry. This method can shorten the ptr field of ITBL entry, and hence allow more ITBL entries to exist in the limited faster memory space.

If a system can afford to let all CTBL entries be pre-allocated with the maximum size among all type_ids. The ITBL ptr field can be eliminated, as each ITBL entry has the same entry index as its CTBL entry.

III. Computing Device for Uniformly Caching Non-Uniform Lengths (FIG. 5)

Figure 5:
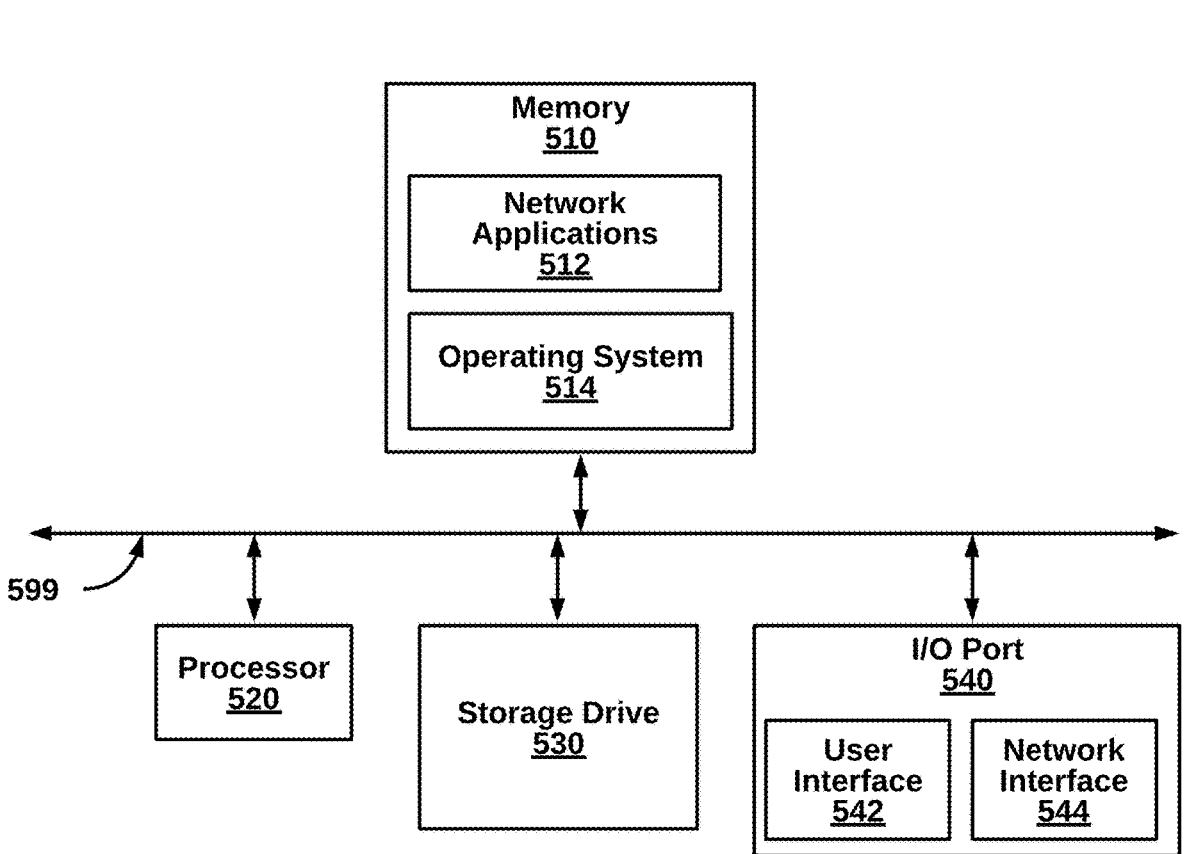
FIG. 5 is a block diagram illustrating an example computing device implementing the packet processor of FIG. 1, according to one embodiment.

FIG. 5 is a block diagram illustrating a computing device 500 implementing the packet processor 100 of FIG. 1, according to one embodiment. The computing device 500 is a non-limiting example device for implementing each of the components of the system 100, including the firewall device 110 and the station 120. Additionally, the computing device 500 is merely an example implementation itself, since the system 100 can also be fully or partially implemented with

8 laptop computers, tablet computers, smart cell phones, Internet access applications, and the like.

The computing device 500, of the present embodiment, includes a memory 510, a processor 520, a hard drive 530, and an I/O port 540. Each of the components is coupled for electronic communication via a bus 550. Communication can be digital and/or analog, and use any suitable protocol.

The memory 510 further comprises network access applications 512 and an operating system 514. Network access applications can include 512 a web browser, a mobile access application, an access application that uses networking, a remote access application executing locally, a network protocol access application, a network management access application, a network routing access applications, or the like.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for access applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a dual-stage cache of a packet processor for cache look up during packet processing by uniformly caching non-uniform lengths of payload data that have various lengths of keys to the payload data, the method comprising:

receiving a data packet with a header and a payload at the packet processor, wherein metadata of the data packet includes a key and a type ID, wherein the packet processor comprises a dual-stage cache having an index table with uniform length entry size and having a content table to store different cached key data payload data;

at a first stage, searching cells of a row of the index table, using a portion of a unified hash value bits, calculated from the type ID and key of the packet header retrieved from metadata, as index to identify the row of the index table, and identifying a pointer to the content table by comparing an index table tag of an entry of a cell with a calculated tag of the hash to identify a cell in the row, and at a second stage, looking up a cell in the content table, responsive to a match of calculated tag of the hash and index table tag of entry, comparing the current full key value and the full key value in the content table entry, wherein the content table full key value is retrieved using a pointer from the cell of the index table to the content table from the cell entry, and bypassing a comprehensive policy search by obtaining the payload data in the content table.

2. The method of claim 1, wherein the data packet metadata comprises the header.

3. A non-transitory computer-readable medium in a dual-stage cache of a packet processor for cache look up during packet processing by uniformly caching non-uniform lengths of payload data that have various lengths of keys to the payload data, the method comprising:

receiving a data packet with a header and a payload at the packet processor, wherein metadata of the data packet includes a key and a type ID, wherein the packet processor comprises a dual-stage cache having an index table with uniform length entry size and having a content table to store different cached key data payload data;

at a first stage, searching cells of a row of the index table, using a portion of a unified hash value bits, calculated from the type ID and key of the packet header retrieved from metadata, as index to identify the row of the index table, and identifying a pointer to the content table by comparing an index table tag of an entry of a cell with a calculated tag of the hash to identify a cell in the row, and at a second stage, looking up a cell in the content table, responsive to a match of calculated tag of the hash and index table tag of entry, comparing the current full key value and the full key value in the content table entry, wherein the content table full key value is retrieved using a pointer from the cell of the index table to the content table from the cell entry, and bypassing a comprehensive policy search by obtaining the payload data in the content table.

4. A dual-stage cache of a packet processor for cache look up during packet processing by uniformly caching non-uniform lengths of payload data that have various lengths of keys to the payload data, the network device comprising:

a database of network policies; and a dual stage cache receiving a data packet with a header and a payload at the packet processor, wherein meta-data of the data packet includes a key and a type ID, wherein the packet processor comprises a dual-stage cache having an index table with uniform length entry size and having a content table to store different cached key data payload data;

at a first stage, searching cells of a row of the index table, using a portion of a unified hash value bits, calculated from the type ID and key of the packet header retrieved from metadata, as index to identify the row of the index table, and identifying a pointer to the content table by comparing an index table tag of an entry of a cell with a calculated tag of the hash to identify a cell in the row, and at a second stage, looking up a cell in the content table, responsive to a match of calculated tag of the hash and index table tag of entry, comparing the current full key value and the full key value in the content table entry, wherein the content table full key value is retrieved using a pointer from the cell of the index table to the content table from the cell entry, and bypassing a comprehensive policy search by obtaining the payload data in the content table.

5. The method of claim 1, wherein the packet processor is contained with in a network device communicatively coupled with a data communication network.

6. The method of claim 1, wherein the key is calculated by one or more fields from the data packet, wherein the one or more fields includes a source IP address, a destination IP address, a protocol, a source port and a destination port.

\* \* \* \* \*